United States Patent
Mueller

(10) Patent No.: US 9,853,852 B2
(45) Date of Patent: *Dec. 26, 2017

(54) SYSTEMS AND METHODS FOR DETERMINING THE NUMBER OF CHANNEL ESTIMATION SYMBOLS BASED ON THE CHANNEL COHERENCE BANDWIDTH

(71) Applicant: Entropic Communications LLC, Carlsbad, CA (US)

(72) Inventor: Arndt J. Mueller, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/816,346

(22) Filed: Aug. 3, 2015

(65) Prior Publication Data

US 2016/0006595 A1 Jan. 7, 2016

Related U.S. Application Data

(63) Continuation of application No. 12/491,782, filed on Jun. 25, 2009, now Pat. No. 9,100,256.

(60) Provisional application No. 61/145,042, filed on Jan. 15, 2009.

(51) Int. Cl.
| | |
|---|---|
| *H04K 1/10* | (2006.01) |
| *H04L 27/28* | (2006.01) |
| *H04L 25/02* | (2006.01) |
| *H04L 27/26* | (2006.01) |

(52) U.S. Cl.
CPC .......... *H04L 27/28* (2013.01); *H04L 25/0202* (2013.01); *H04L 27/2607* (2013.01); *H04L 27/2647* (2013.01)

(58) Field of Classification Search
CPC ... H04L 25/0226; H04L 5/0048; H04L 27/28; H04L 25/0202; H04L 27/2607; H04L 27/2647
See application file for complete search history.

(56) References Cited

U.S. PATENT DOCUMENTS

| | | | |
|---|---|---|---|
| 6,298,035 B1 | 10/2001 | Heiskala | |
| 2004/0009781 A1* | 1/2004 | Andrews | ................... H04L 1/06 455/515 |
| 2004/0257979 A1 | 12/2004 | Ro et al. | |

(Continued)

*Primary Examiner* — Shuwang Liu
*Assistant Examiner* — Sung Ahn
(74) *Attorney, Agent, or Firm* — McAndrews, Held & Malloy, Ltd.

(57) ABSTRACT

Various systems and methods are provided for channel estimation. These systems and methods (a) determine a coherence bandwidth for the channel, (b) adapt the channel estimation based on the coherence bandwidth, and (c) perform channel estimation by transmitting a channel estimation symbol over a channel. In some embodiments, the channel estimation is adapted based on the coherence bandwidth. This may include selecting a number of channel estimation symbols to transmit in a packet. Additionally, the number of channel estimation symbols transmitted in a packet can be selected by increasing the number of channel estimation symbols when the coherence bandwidth of the channel is high or decreasing the number of channel estimation symbols when the coherence bandwidth of the channel is low.

21 Claims, 4 Drawing Sheets

(56) References Cited

U.S. PATENT DOCUMENTS

| | | | |
|---|---|---|---|
| 2007/0049279 A1 | 3/2007 | Van Rensburg et al. | |
| 2007/0082692 A1* | 4/2007 | Tirkkonen | H04L 5/0023 455/522 |
| 2007/0110172 A1 | 5/2007 | Faulkner et al. | |
| 2007/0195899 A1* | 8/2007 | Bhushan | H04B 7/0452 375/260 |
| 2008/0095195 A1 | 4/2008 | Ahmadi et al. | |
| 2008/0268887 A1 | 10/2008 | Jansen et al. | |
| 2008/0304605 A1* | 12/2008 | Aziz | H04L 25/0216 375/347 |
| 2009/0092154 A1 | 4/2009 | Malik et al. | |
| 2009/0175370 A1* | 7/2009 | Kuroda | H04L 5/005 375/260 |
| 2009/0279589 A1* | 11/2009 | Nguyen | H04L 5/0023 375/141 |

\* cited by examiner

SYSTEMS AND METHODS FOR DETERMINING THE NUMBER OF CHANNEL ESTIMATION SYMBOLS BASED ON THE CHANNEL COHERENCE BANDWIDTH

RELATED APPLICATIONS

This application claims priority to, and is a continuation of U.S. application Ser. No. 12/491,782 filed Jun. 25, 2009, now U.S. Pat. No. 9,100,256, and which claims priority to U.S. Provisional Application No. 61/145,042, having a filing date of Jan. 15, 2009. Each of the above referenced documents is hereby incorporated herein by reference in its entirety.

BACKGROUND OF THE INVENTION

This disclosure relates to communication systems, and at least some of the examples disclosed herein relate more particularly to systems and methods for determining the number of channel estimation symbols to be transmitted to estimate a channel of a communications link based on the channel coherence bandwidth of the channel.

FIG. 1 is a diagram that illustrates an example of a wireless environment. An area 100 includes various transmitting and receiving devices 102, 104, and 106. These devices 102, 104, and 106 can include mobile phones, radio and television transmitters, wireless networking devices, etc. Some of the devices 102, 104, and 106 are mobile devices; some are not mobile. Mobile or not, however, the communication environment in which these devices operate is constantly changing. Signals from these devices 102, 104 and 106 reflect off buildings 108, vehicles 110 and 112, hills 114 and other features of the geographic area 100. Further, features of the area 100 are changing. Vehicles 110 and 112 move, people move within the area 100, weather patterns change, new buildings are built, etc. All of these and many other factors lead to a constantly changing communications environment.

The characteristics of wired communications channels, on the other hand, tend to be more consistent, even though they may vary with temperature, equipment changes, etc. Because of this relative consistency, it can be advantageous to estimate certain channel characteristics in ways not used in a wireless communication system, even if these wired systems use similar modulation techniques.

One example of a wired system is the system defined by the Multimedia over Coax Alliance (MoCA™). In a MoCA system, coaxial cables are used to connect components of the network, such as computers, TVs, set top boxes and radios, and generally, to distribute Ethernet signals throughout a home or building. MoCA systems are generally used to allow such entertainment devices within a home network to communicate with one another and share data, including multimedia data, such as television shows, movies, internet data, music, video clips, etc. One advantage of such MoCA systems is that new home wiring might be avoided because many homes already have adequate coaxial wiring installed. MoCA systems are typically used to distribute high-quality multimedia content and high-speed data with throughput exceeding 100 megabit per second. MoCA devices generally communicate with one another in the 1 GHz microwave band using orthogonal frequency-division multiplexing (OFDM) modulation. The OFDM modulated signals used by MoCA are communicated over MoCA channels using frequency-division multiplexing (FDM). In MoCA systems that use OFDM, each MoCA channel is formed from one of a large number of closely-spaced orthogonal sub-carriers. These MoCA channels are typically used to carry data. Each sub-carrier is typically modulated with a conventional modulation scheme at a low symbol rate, maintaining total data rates similar to conventional single-carrier modulation schemes in the same bandwidth. Some example modulations include quadrature amplitude modulation (QAM) or phase shift keying (PSK) modulation.

In order to take advantage of the maximum bandwidth of each channel, some systems may characterize each channel between each device and each other device. The characteristics of each channel are determined by transmitting an error vector magnitude (EVM) probe consisting of a fixed pattern from one device, i.e., a node in the network, to each other device that serves as a node on the network. Each such receiving device measures the deviation from the fixed pattern of the EVM probe in order to determine the amount of distortion to symbols transmitted over the channel due to gain, phase, delay and other characteristics of the channel.

In some multi-carrier communication systems, such as OFDM systems, channel estimation is used to characterize each channel so that the effects of variations in gain, phase and delay can be removed from the playload in order to provide reliable decoding of data in a communication system. Wireless communications will often experience different channel responses either in different environments or at different times, or both. These changes may be due to multi-path phenomena, for example. Channel estimation can be used to improve the quality of communications in a communication environment. Wired systems may also benefit from channel estimation because the channel estimation information can be used to characterize the wired communication environment. This environment may also vary over time due to component changes, temperature changes, etc.

Some OFDM systems may use a pilot sub-carrier to provide channel estimation with respect to data sub-carriers. In OFDM systems there are generally enough pilot sub-carriers and the distribution of the pilot sub-carriers may be uniform and contiguous such that the channel response of the data sub-carriers can be estimated relatively accurately from a measured pilot sub-carrier channel response. Accordingly, Channel estimation may be performed using OFDM symbols where some subset of subcarriers is used for channel estimation and the remaining subset of subcarriers is used for data. The subset of subcarriers used for channel estimation may change from OFDM symbol to OFDM symbol. OFDM symbols which consist solely of channel estimation subcarriers are called channel estimation symbols. In some OFDM systems such as MOCA systems, a complete OFDM symbol (a symbol that is transmitted on all sub-carriers) is transmitted to estimate the channel. Such symbols are called channel estimation symbols. Some protocols, such as MoCA 1.0, mandate that every packet start with exactly two channel estimation symbols. Since channel estimation symbols take up bandwidth, there is a need for a method and apparatus that can reduce the number of channel estimation symbols and thus increase the data throughput over the network.

BRIEF SUMMARY OF THE INVENTION

Various embodiments of systems and methods for determining the number of channel estimation symbols to use are presented. Some embodiments of the disclosed method and apparatus are directed toward systems and methods that (a) determine a coherence bandwidth for the channel, (b) adapt the channel estimation based on the coherence bandwidth, and (c) perform channel estimation by transmitting a channel estimation symbol over a channel. However, always using two channel estimation symbols in channels with high coherence bandwidth is inefficient. That is, when there is high coherence bandwidth, it may not require two channel estimation symbols to estimate the channel. If those channel estimation symbols were not needed then data can be sent instead.

Determining the minimum number of channel estimation symbols that should be sent for a particular channel using a particular communication system may improve data throughput. In an OFDM or other communication system, the coherence bandwidth is a statistical measurement of the range of frequencies over which the channel can be considered "flat." A flat channel is one over which two frequencies of a signal are likely to experience comparable or correlated amplitude fading. Frequencies that lie within the same coherence bandwidth as one another tend to all fade in a similar or correlated fashion. Accordingly, when fading occurs it occurs only over a relatively small fraction of the total signal bandwidth. The portion of the signal bandwidth over which fading does not occur typically contains enough signal power to sustain reliable communications.

In some embodiments, the channel estimation is performed by determining the channel coherence bandwidth and then sending channel estimation symbols, the number of which is determined based on the coherence bandwidth. In some embodiments, this is done by decreasing the number of channel estimation symbols when the coherence bandwidth of the channel is high and increasing the number of channel estimation symbols when the coherence bandwidth of the channel is low.

In one embodiment, the channel estimation is adapted based on the coherence bandwidth by selecting between transmitting either one or two channel estimation symbols based on the coherence bandwidth. The cyclic prefix length is indicative of the coherence bandwidth and may be determined based on channel profiling. In some embodiments, one channel estimation symbol is used when the cyclic prefix length is less than or equal to ⅛ of a symbol length for a symbol used and two channel estimation symbols are used when the cyclic prefix length is greater than ⅛ of the symbol length for the symbol used.

It will be understood, however, that different symbol length cut-offs may be used in other embodiments. For example, 1/16 or ¼ of a symbol length might be used to determine when to transition between one and two channel estimation symbols. In some embodiments, more than two channel estimation symbols might be used for packet transmission. The number of channel estimation symbols transmitted may be decreased when coherence bandwidth is high and increased when the coherence bandwidth of the channel is low.

The larger the coherence bandwidth, the more correlated the channel effects between adjacent subcarriers will be. If for two subcarriers, the channel is completely correlated (100% correlated), then the channel for those two subcarriers is identical and channel estimates performed on each subcarrier can be averaged to remove estimation noise. If for those two subcarriers, the channel is completely uncorrelated (0% correlated), then the channel for those two subcarriers will be completely independent and thus no averaging can be performed. For some OFDM systems, there is typically considerable correlation between adjacent subcarriers. This correlation diminishes for second-adjacent subcarriers and goes to zero for subcarriers separated by relatively large distances in frequency. This is equivalent to a weighted average over frequency.

Other features and aspects of the disclosed method and apparatus will become apparent from the following detailed description, taken in conjunction with the accompanying drawings, which illustrate, by way of example, the features in accordance with embodiments. The summary is not intended to limit the scope of the invention, which is defined solely by the claims attached hereto.

BRIEF DESCRIPTION OF SEVERAL VIEWS OF THE DRAWINGS

The disclosed method and apparatus, in accordance with one or more various embodiments, is described in detail with reference to the following figures. The drawings merely depict examples of embodiments. These drawings are provided to facilitate the reader's understanding of the disclosed method and apparatus and should not be considered limiting of the breadth, scope of the claimed invention. It should be noted that for clarity and ease of illustration these drawings are not necessarily made to scale.

The figures are not intended to be exhaustive or to limit the disclosed method and apparatus to the precise form disclosed. It should be understood that the disclosed method and apparatus can be practiced with modification and alteration. The claimed invention should be defined only by the claims and the equivalents thereof.

DETAILED DESCRIPTION OF THE INVENTION

Systems and methods for determining the number of channel estimation symbols based on the channel coherence bandwidth are disclosed. While MoCA using OFDM is presented as an example system below, it will be understood by those of skill in the art that other wired communication or slowly varying wireless communications systems may also use the disclosed method and apparatus.

Figure 1:
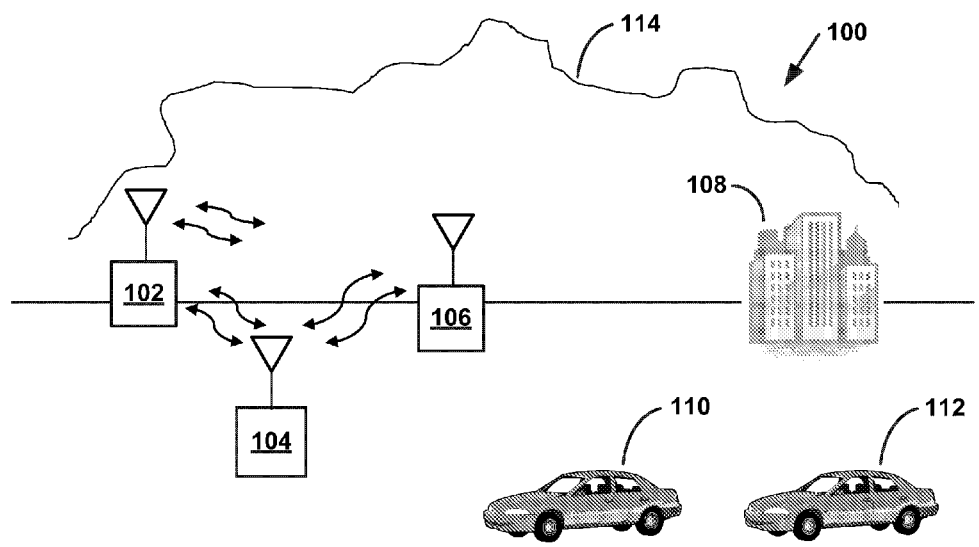
FIG. 1 is a diagram that illustrates an example wireless environment.
Figure 2:
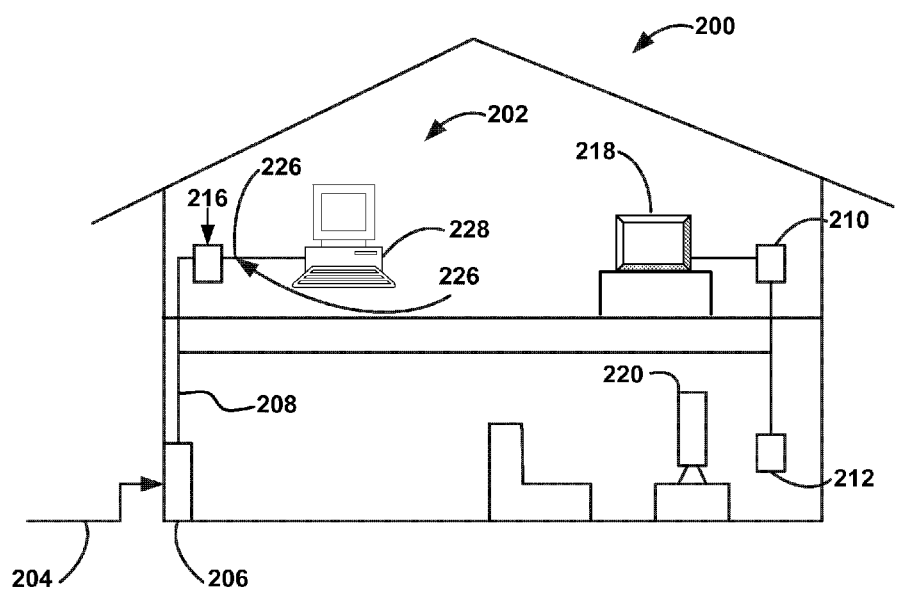
FIG. 2 illustrates an example wired environment for an entertainment network in accordance with the systems and methods described herein.

FIG. 2 illustrates an example entertainment network 202 that might incorporate a communication system in accordance with the systems and methods described herein. The entertainment network 202 is located in a typical family home 200. However, it will be understood that the systems and methods described herein can be applied to various other types of buildings or outdoor locations that might use communication networks, such as, but not limited to, the entertainment network 202 illustrated in FIG. 2.

The home 200 is provided with entertainment services through a connection 204 with an entertainment service provider. This connection may be a wired or wireless connection such as cable, satellite, fiber optic, or other communication connection and can include internet service, television programming, etc.

In some embodiments, connection 204 supports the communication of content associated with multiple data services from multiple service providers. For example, a homeowner might use satellite receivers for receiving television content and Digital Subscribers Line (DSL) service to receive internet service. These services might all be connected to a network device 206 that then provides these services to people in the home 200 over a wired home network 208. The wired network might use typical computer network wiring or other types of wiring. For example, the home network 208 might use Ethernet cabling or coaxial cable with a network defined by a communication standard, such as MoCA 1.0. A MoCA or similar network is easy to set up in homes 200 in which adequate coaxial cables have been previously installed.

In some examples, telephone services are provided using a connection 204. These services are then routed throughout the home 200 over the wired network 208. Alternatively, these telephone services are connected from the network device 206 to a separate telephone system (not shown) within the home 200. As will be understood by those skilled in the art, many different combinations of services that use the connection 204 and methods of distribution within the home 200 are possible with the disclosed embodiments.

In one embodiment, the network device 206 is a network controller. In such an embodiment, the controller 206 provides control functionality for the network 208. This network 208 is a MoCA network in some embodiments. In the example network 208, internet services and television services are provided through the network 208. As illustrated in FIG. 2, the network 208 is connected to network devices 210, 212 and 216. In one embodiment, the network devices 210 and 212 are set top boxes that provide television programming content that can be viewed using the televisions 218 and 220. The network device 216 provides a computer network connection 226 to a personal computer 228. For example, a personal computer 228 is connected to the internet using the network device 216. In some embodiments, the network device 216 can also include a wireless component, such as 802.11.80, to which other computers can connect, e.g., over the internet.

Channel characteristics can be determined for the network 208 by transmitting an EVM probe packet to a receiving device at the other end of the channel. The channel characteristics are determined using the EVM probe packet. One such channel characteristic that can be directly measured is the coherence bandwidth. However, an alternative method is to measure the delay spread of the channel. The delay spread is inversely proportional to the coherence bandwidth. The delay spread is a measure of the length of the impulse response of the channel. The longer the impulse response of the channel, the smaller the coherence bandwidth.

In some embodiments, the delay spread is measured to determine the length of a cyclic prefix to be added between data symbols. Cyclic prefix length is the number of bits that are added between symbols to ensure that there is no intersymbol interference due to delay spread over the channel. Delay spread may be determined based on the response of the channel to the EVM probes. Coherence bandwidth is inversely proportional to delay spread.

As discussed above, the coherence bandwidth is a statistical measurement of the range of frequencies over which the channel can be considered "flat." A flat channel is one for which the frequencies of the channel are likely to experience comparable or correlated amplitude fading. Frequencies within the same coherence bandwidth tend to all fade in a similar or correlated fashion. If the coherence bandwidth is relatively narrow with respect to the total signal bandwidth, then when fading occurs it occurs only over a relatively small fraction of the total signal bandwidth.

If the coherence bandwidth is large, then the variations between adjacent sub-carriers will be small. On the other hand, if the coherence bandwidth is small, then the variations between adjacent sub-carriers will be large. In accordance with the disclosed method and apparatus, for OFMD systems, a relatively large coherence bandwidth can be exploited to improve the channel estimate by averaging over sub-carriers that are close in frequency. By averaging over sub-carriers that are close in frequency, averaging over time between channel estimation symbols can be reduced or eliminated without any degradation in the estimate. The reason for this will become clear below.

Figure 3:
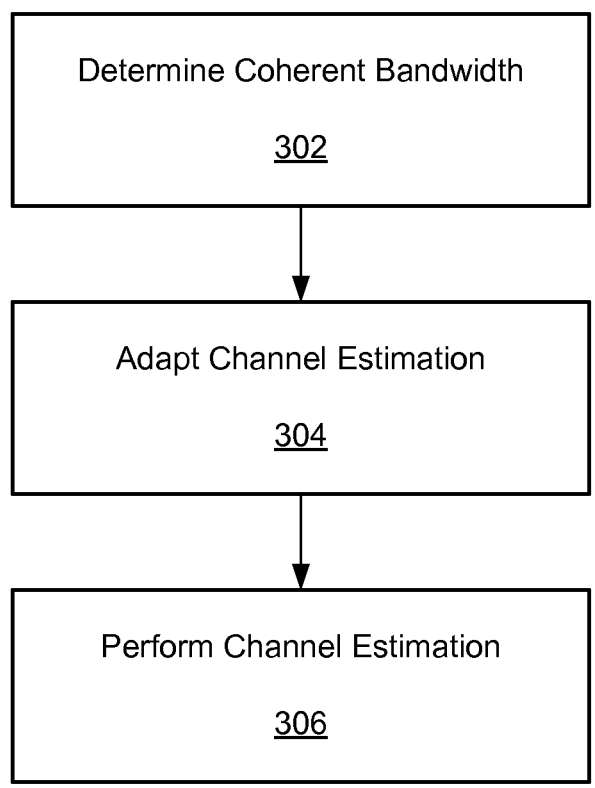
FIG. 3 is a flow chart illustrating an example method in accordance with the systems and methods described herein.

FIG. 3 is a flow chart illustrating one example of a method in accordance with the systems and methods described herein. In step 302, the coherence bandwidth of the channel is determined. In step 304, channel estimation is performed by selecting the number of channel estimation symbols based on the coherence bandwidth. The channel estimator can average out noise between sub-carriers in the channel better for channels with higher coherence bandwidth and not as well for channels with lower coherence bandwidth. For channels with lower coherence bandwidth, multiple channel estimation symbols may be needed so that averaging can be done over time, rather than over frequency (i.e., across multiple sub-carriers). Accordingly, in one embodiment, when multiple channel estimation symbols are transmitted, time averaging can be used to assist in estimating channel response. However, for channels with higher coherence bandwidth, fewer channel estimation symbols are typically required since averaging can be done over frequency. For example, in some embodiments, a decision is made as to whether to use one or two channel estimation symbols based upon the relative length of the cyclic profile with respect to the OFDM symbol length.

In one embodiment of the disclosed method and apparatus, the cyclic prefix length is indicative of the coherence bandwidth and may be determined based on channel profiling. In one such embodiment, when the length of the cyclic profile is less than ⅛ of OFDM symbol length, then one channel estimation symbol is used. Otherwise, two channel estimation symbols are used. It should be understood that in addition to reducing the number of channel estimation symbols, the number of channel estimation sub-carriers (i.e., subcarriers dedicated to channel estimation) can also be reduced.

When a channel estimation symbol is transmitted, that symbol cannot be used to transmit other data. Accordingly, decreasing the number of channel estimation symbols in a communication system is typically desirable. On the other hand, however, channel estimation symbols perform an important function in allowing a communication system to perform channel estimation. In some multi-carrier communication systems, such as OFDM systems, channel estimation is used to characterize each channel so that the channels might provide reliable decoding of data in a communication system. Wireless communications will often experience different channel responses either in different environments or at different times, or both. These changes may be due to multi-path fading, for example. Channel estimation can be used to improve the quality of communications in a communication environment. Wired systems may also benefit from channel estimation because the channel estimation information can be used to characterize the wired communication environment. This environment may also vary over time due to component changes, temperature changes, etc.

In step 306, channel estimation is performed. The channel estimation can be performed by, for example, transmitting a channel estimation symbol as part of a communication packet. One or more channel estimation symbols may be transmitted. In some cases, limiting the number of channel estimation symbols improves throughput by allowing more data symbols to be transmitted in the place of the eliminated channel estimation symbols.

Figure 4:
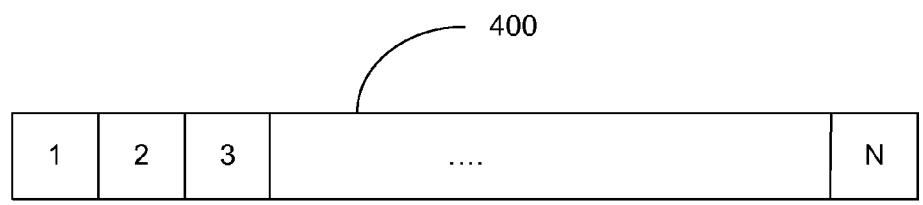
FIG. 4 illustrates an example channel in accordance with the systems and methods described herein.

FIG. 4 is a diagram illustrating an example channel 400 in accordance with the systems and methods described herein. The channel 400 is broken into N sub-carriers. The sub-carriers may be used to transmit data. For example, some embodiments use an OFDM system made up of a number of sub-carriers to transmit data from one OFDM device to another. These transmissions may be wireless or wired transmissions, depending on the requirements of the particular system involved.

In OFDM, the sub-carrier frequencies may be chosen so that the sub-carriers are orthogonal to each other. If the sub-carriers are orthogonal, cross-talk between the sub-carriers may be decreased such that inter-carrier guard bands are not used. Eliminating inter-carrier guard bands can simplify the design of OFDM transmitters and the receivers because separate filters for each sub-carrier may not be required.

The packets transmitted may include one or more channel estimation symbols. The number of channel estimation symbols used can vary from one channel to another. Some channels may use one channel estimation symbol, while other channels use two or more.

Figure 5:
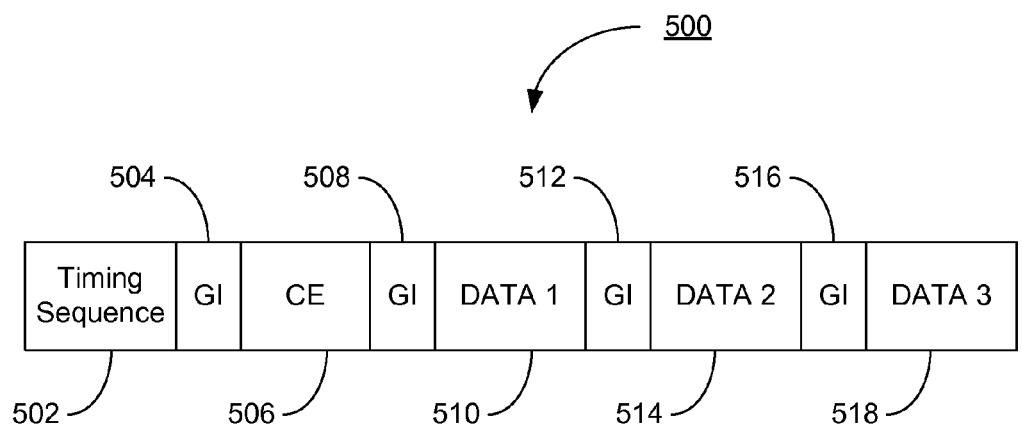
FIG. 5 illustrates an example packet structure in accordance with the systems and methods described herein.
Figure 6:
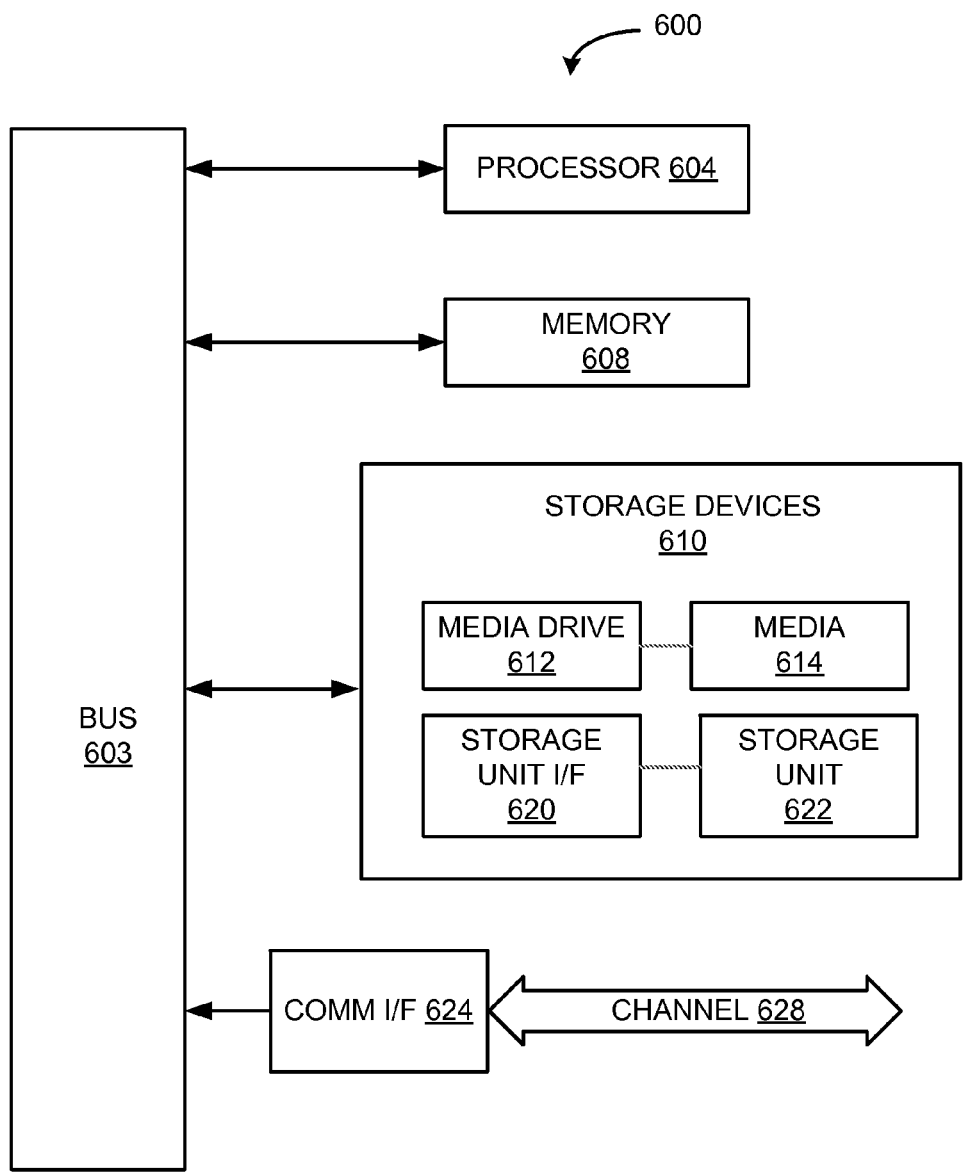
FIG. 6 is a block diagram illustrating an example computing module in accordance with the systems and methods described herein.

FIG. 5 is a diagram illustrating an example packet structure 500 in accordance with the systems and methods described herein. The packet 500, in the illustrated example, includes a timing sequence 502. The timing sequence 502 may be used to synchronize transmissions so that the beginning and ending of symbols can be accurately determined by the receiving device.

The packet 500 also includes a guard interval 504. The long duration of each symbol makes it practical to use such guard intervals 504, 508, 512, and 516. The guard intervals 504, 508, 512, and 516 are inserted between the OFDM symbols. This decreases intersymbol interference. In some embodiments, the guard intervals 504, 508, 512, and 516 eliminate the need for a pulse-shaping filter, reduce the sensitivity to time synchronization problems, or both.

In some embodiments, the guard intervals 504, 508, 512, and 516 are a cyclic prefix. The cyclic prefix is at the beginning of an OFDM symbol. Alternatively, the cyclic prefix can be located at the end. In one embodiment, a portion of the OFDM symbol used is transmitted during the guard interval 504, 508, 512, and 516 and is followed by the OFDM symbol. Transmitting a portion of an OFDM symbol during the guard interval allows the receiver to integrate over an integer number of sinusoid cycles for each of the multipaths when it performs OFDM demodulation with the Fast Fourier Transform (FFT).

The packet 500 also includes a channel estimation portion 506. In one embodiment, the channel estimation portion 506 includes one or more channel estimation symbols. The number of channel estimation symbols varies from one packet to another based on the systems and methods described herein. In one example, channels with low coherence bandwidth use multiple channel estimation symbols, while channels with high coherence bandwidth use fewer or a single channel estimation symbol. In this way, throughput may be increased in some cases.

In some embodiments, a system selects between transmitting one or two channel estimation symbols. The selection can be made based on, for example, the cyclic prefix length. The cyclic prefix length is indicative of the coherence bandwidth and may be determined based on channel profiling.

In some embodiments, if the cyclic prefix length is less than $1/8$ of the OFDM symbol length, then only one channel estimation symbol is used. If the cyclic prefix length is greater than $1/8$ of the OFDM symbol length, then two channel estimation symbols may be used. (Generally, many OFDM systems limit the cyclic prefix length to a maximum of $1/4$ of the OFDM symbol length.) For short packets, e.g., a single symbol unicast packet, which may include approximately 480+ data bytes, the channel estimation overhead is about 62% of the packet when two channel estimation symbols are used and 47% when one channel estimation symbol is used. This savings of 25% improves throughput.

The packet 500 also includes data portions 510, 514, and 518. These data portions 510, 514, and 518 can include data symbols. The data symbols may be, for example, user data that is transmitted from one communication device to another.

A Computing module 600 might also include a communications interface 624. The Communications interface 624 might be used to allow software and data to be transferred between the computing module 600 and external devices. Examples of a communications interface 624 might include a modem or soft-modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via the communications interface 624 might typically be carried on signals, which can be electronic, electromagnetic (which includes optical) or other signals capable of being exchanged by a given communications interface 624. These signals might be provided to the communications interface 624 via a channel 628. This channel 628 might carry signals and might be implemented using a wired or wireless communication medium. These signals can deliver the software and data from memory or other storage medium in one computing system to memory or other storage medium in the computing system 600. Some examples of a channel might include a phone line, a cellular link, an RF link, an optical link, a network interface, a local or wide area network, and other wired or wireless communications channels.

In a multi-channel system, (perhaps better thought of as a multi-sub-channel system) a channel estimation symbol may be transmitted on one or more of the sub-channels that make up the communication channel. The number of channel estimation symbols transmitted can be based on the coherence bandwidth.

In this document, the terms "computer program medium" and "computer usable medium" are used to generally refer to physical storage media such as, for example, memory 608, a storage unit 620, and media 614. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein While various embodiments of the disclosed method and apparatus have been described above, it should be understood that they have been presented by way of example only, and should not limit the scope of the claimed invention. Likewise, the various diagrams may depict an example architectural or other configuration for the disclosed method and apparatus, which is done to aid in understanding the features and functionality that can be included. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described using various embodiments and implementations, it should be understood that the various features, aspects and functionality described in one or more of the individual embodiments are not limited in their applicability to the particular embodiment with which they are described, but instead can be applied, alone or in various combinations, to one or more of the other disclosed embodiments, whether or not such embodiments are described to include that feature. Thus, the breadth and scope of the present invention should not be limited by any of the above-described embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method comprising:
    determining, by an electronic communication device, one or more characteristics of signal communicated on a channel, wherein the one or more characteristics are indicative of a coherence bandwidth of the channel; and
    determining, by the electronic communication device, how many channel estimation symbols to include in a packet to be transmitted over the channel based on the one or more characteristics;
    transmitting, by the electronic communication device, the packet over the channel;
    receiving, by a receiver, the packet over the channel;
    if the packet comprises a plurality of channel estimation symbols, performing time averaging over the plurality of channel estimation symbols; and
    if the packet comprises a single channel estimation symbol, performing frequency averaging over sub-carriers of single channel estimation symbol.

2. The method of claim 1, comprising:
    determining, by the electronic communication device, to include a first, higher number of channel estimation symbols in the packet when the one or more characteristics are indicative of the channel having a first, smaller coherence bandwidth; and
    determining, by the electronic communication device, to include a second, lower number of channel estimation symbols in the packet when the one or more characteristics are indicative of the channel having a second, larger coherence bandwidth.

3. The method of claim 1, wherein the one or more characteristics comprise cyclic prefix length of said signal.

4. The method of claim 3, comprising performing, by the electronic communication device, channel profiling to determine the cyclic prefix length.

5. The method of claim 3, comprising:
    determining, by the electronic communication device, to include a second, lower number of channel estimation symbols in the packet when the cyclic prefix length is less than ⅛ of a symbol length; and
    determining, by the electronic communication device, to include a first, higher number of channel estimation symbols in the packet when the cyclic prefix length is greater than ⅛ of the symbol length.

6. The method of claim 5, wherein the first, smaller number of channel estimation symbols is one, and the second, larger number of channel estimation symbols is two.

7. A communication system comprising:
    a transmitter configured to transmit a packet over a channel;
    a first processor configured to:
        determine one or more characteristics of a signal communicated on the channel, wherein the one or more characteristics are indicative of a coherency bandwidth of the channel; and determine how many channel estimation symbols to include in the packet based on the one or more characteristics;
a receiver configured to receive the packet; and
a second processor configured to:
perform time averaging over the plurality of channel estimation symbols if the packet comprises a plurality of channel estimation symbols; and
perform frequency averaging over sub-carriers of single channel estimation symbol if the packet comprises a single channel estimation symbol.

8. The communication system of claim 7, wherein said first processor is configured to:
include a first, higher number of channel estimation symbols in the packet when the one or more characteristics are indicative of the channel having a first, smaller coherence bandwidth; and
include a second, lower number of channel estimation symbols in the packet when the one or more characteristics are indicative of the channel having a second, larger coherence bandwidth.

9. The communication system of claim 7, wherein the one or more characteristics comprise cyclic prefix length of said signal.

10. The communication system of claim 9, wherein said first processor is configured to perform channel profiling to determine the cyclic prefix length.

11. The communication system of claim 9, wherein said first processor is configured to:
include a second, lower number of channel estimation symbols in the packet when the cyclic prefix length is less than ⅛ of a symbol length; and
include a first, higher number of channel estimation symbols in the packet when the cyclic prefix length is greater than ⅛ of the symbol length.

12. The communication system of claim 11, wherein the first, smaller number of channel estimation symbols is one, and the second larger number of channel estimation symbols is two.

13. A communication system comprising:
a transmitter configured to transmit a packet over a channel; and
a first processor configured to:
determine one or more characteristics of a signal communicated on the channel, wherein the one or more characteristics are indicative of a coherency bandwidth of the channel; and
determine, based on the one or more characteristics, whether one or two channel estimation symbols are included in the packet;
a receiver configured to receive the packet; and
a second processor configured to:
perform time averaging over the plurality of channel estimation symbols if the packet comprises a plurality of channel estimation symbols; and
perform frequency averaging over sub-carriers of single channel estimation symbol if the packet comprises a single channel estimation symbol.

14. The communication system of claim 13, wherein said first processor is configured to:
include two channel estimation symbols in the packet when the one or more characteristics are indicative of the channel having a first, smaller coherence bandwidth; and
include one channel estimation symbol in the packet when the one or more characteristics are indicative of the channel having a second, larger coherence bandwidth.

15. The communication system of claim 13, wherein the one or more characteristics comprise cyclic prefix length of said signal.

16. The communication system of claim 15, wherein said first processor is configured to perform channel profiling to determine the cyclic prefix length.

17. The communication system of claim 15, wherein said first processor is configured to:
include one channel estimation symbol in the packet when the cyclic prefix length is less than ⅛ of a symbol length; and
include two channel estimation symbols in the packet when the cyclic prefix length is greater than ⅛ of the symbol length.

18. A communication system comprising:
a transmitter configured to transmit a packet over a channel; and
a first processor configured to:
determine one or more characteristics of a signal communicated on the channel, wherein the one or more characteristics comprise cyclic prefix length of said signal and are indicative of a coherency bandwidth of the channel;
determine, based on the one or more characteristics, whether one or two channel estimation symbols are included in the packet;
include one channel estimation symbol in the packet when the cyclic prefix length is less than ⅛ of a symbol length; and
include two channel estimation symbols in the packet when the cyclic prefix length is greater than ⅛ of the symbol length.

19. The communication system of claim 18, wherein said first processor is configured to:
include two channel estimation symbols in the packet when the one or more characteristics are indicative of the channel having a first, smaller coherence bandwidth; and
include one channel estimation symbol in the packet when the one or more characteristics are indicative of the channel having a second, larger coherence bandwidth.

20. The communication system of claim 18, wherein said first processor is configured to perform channel profiling to determine the cyclic prefix length.

21. The communication system of claim 18, comprising:
a receiver configured to receive the packet; and
a second processor configured to:
perform time averaging over the plurality of channel estimation symbols if the packet comprises a plurality of channel estimation symbols; and
perform frequency averaging over sub-carriers of single channel estimation symbol if the packet comprises a single channel estimation symbol.

* * * * *